United States Patent [19]

Bergstrom

[11] 4,141,386
[45] Feb. 27, 1979

[54] BLAST JOINT

[76] Inventor: Arthur E. Bergstrom, P.O. Box 92181, Houston, Tex. 77206

[21] Appl. No.: 600,616

[22] Filed: Jul. 31, 1975

[51] Int. Cl.² ............................................. F16L 11/14
[52] U.S. Cl. ..................................... 138/147; 166/243
[58] Field of Search ............... 138/147, 110, 114, 115, 138/155, 178; 166/242, 243

[56] References Cited

U.S. PATENT DOCUMENTS

| | | | |
|---|---|---|---|
| 2,925,097 | 2/1960 | Duesterberg | 166/243 X |
| 2,998,848 | 9/1961 | Wright et al. | 166/243 X |
| 3,382,929 | 5/1968 | Plunk | 166/243 X |
| 3,382,930 | 6/1968 | Ribb et al. | 166/243 X |
| 3,904,211 | 9/1975 | Dega | 277/32 |
| 3,995,665 | 12/1976 | Monaghan | 138/147 |

*Primary Examiner*—Charles E. Phillips
*Assistant Examiner*—Willis Little
*Attorney, Agent, or Firm*—George F. Lee

[57] ABSTRACT

The invention provides a blast joint which comprises basically an extended series of short cylindrical rings preferably rectangular in longitudinal axial section, composed of an abrasion resistant material such as cemented tungsten carbide, and disposed coaxially in contact with each other between end retaining rings mounted upon a supporting steel tube which comprises a single section or joined sections of a production tube.

1 Claim, 11 Drawing Figures

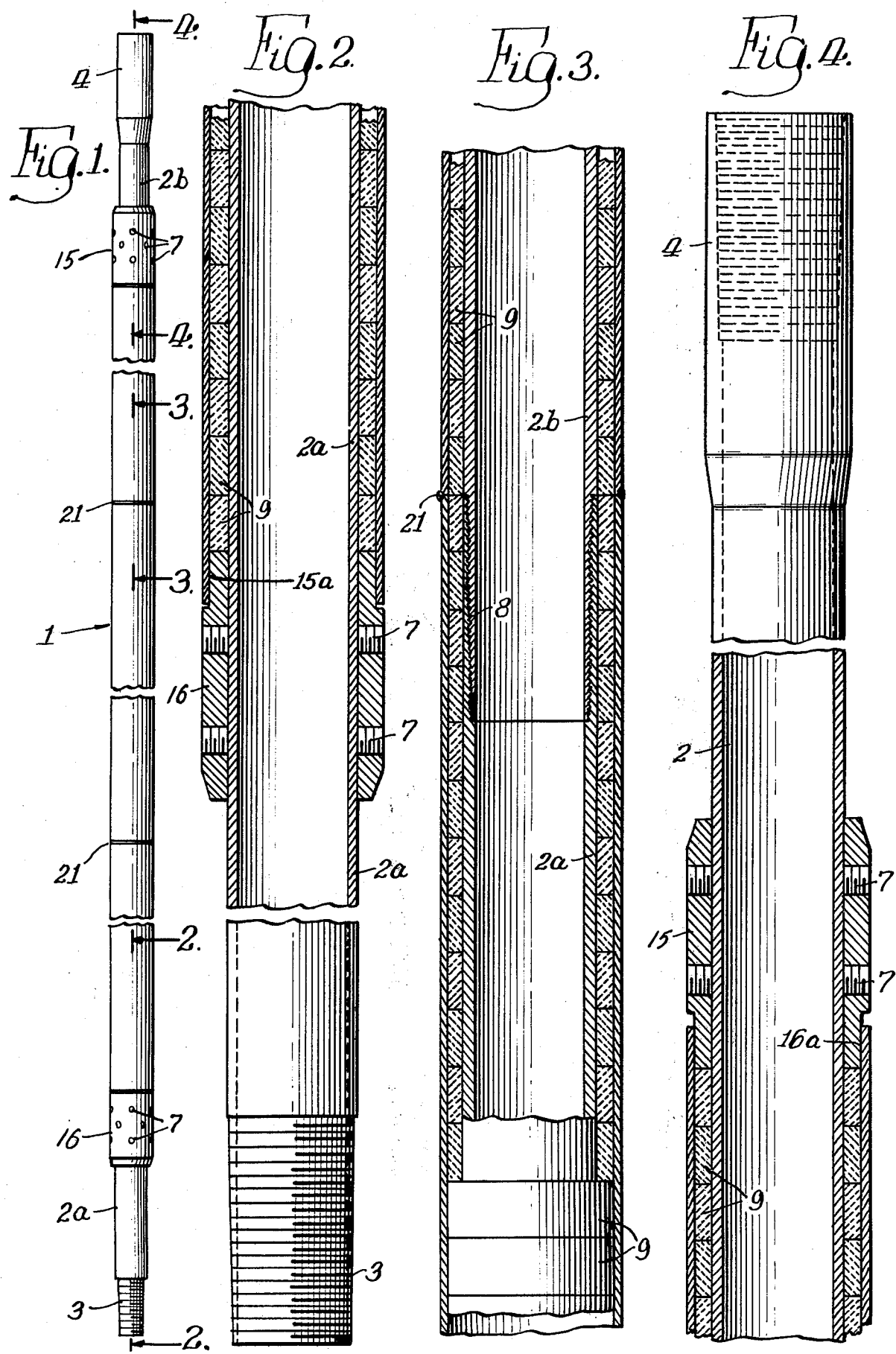

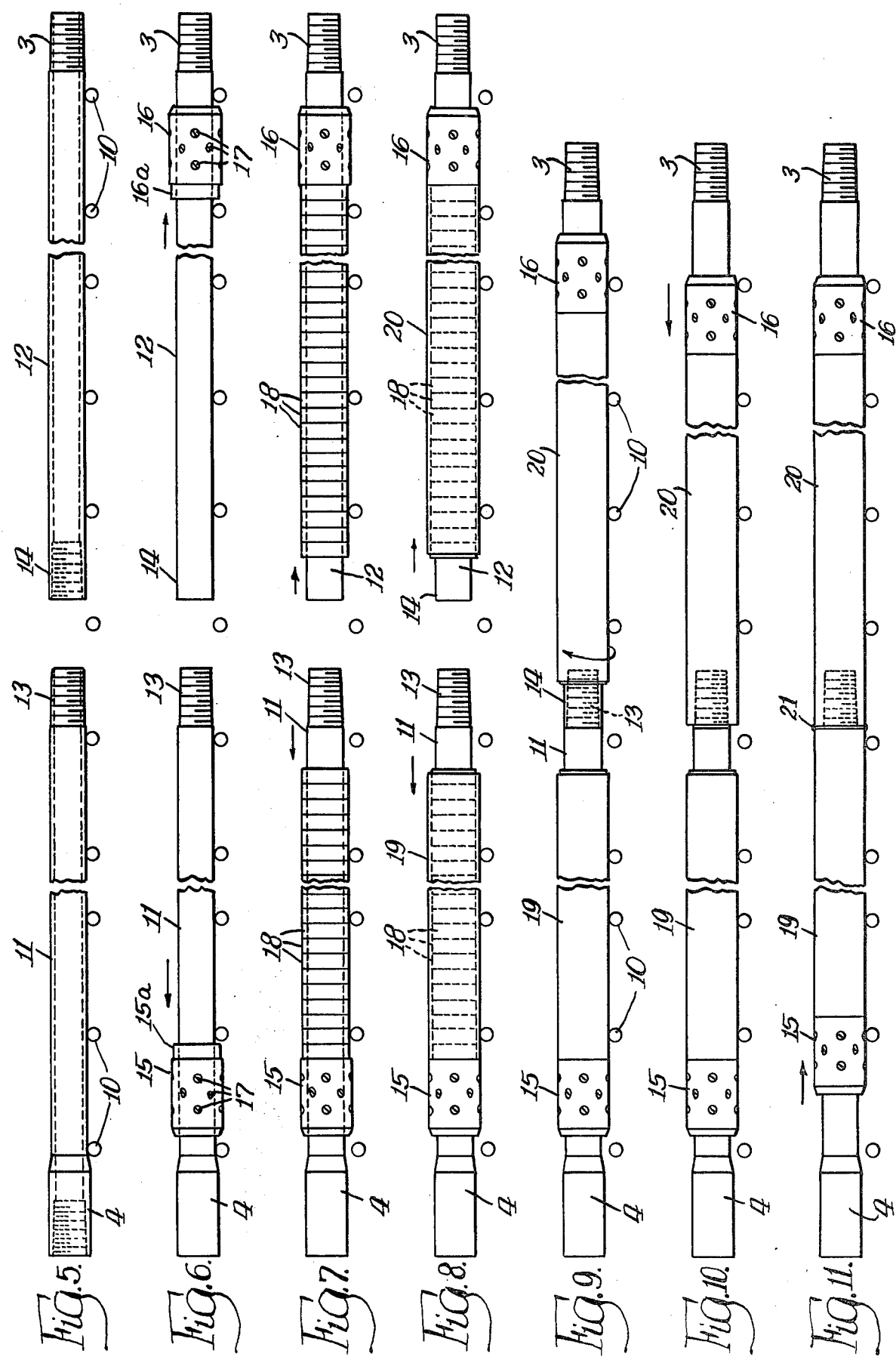

BLAST JOINT

BACKGROUND OF THE INVENTION

The present invention provides a blast joint and method of making the same. The joint produced is designed to be suitable for use in oil and/or gas wells producing to flow of fluid comprising gas, at high pressure, with resultant flow of fluid and entrained solid particles at high velocity escaping. The flow of gas at high velocity from an underground high pressure source, with or without accompanying oil or other liquid, entrains solids, particularly grains of sand. The escaping blast has a highly abrasive or cutting effect upon the surfaces of solids—particularly metals—with which such flow comes into contact.

Blast tubes constructed of cemented tungsten carbide or like abrasion resistant material, have previously been proposed but never, so far as is known to applicant, brought into successful practice, first, because it is a most refractory material, difficult to work, heavy, brittle, hard to produce, difficult to apply, and of exceeding hardness. The properties of cemented tungsten carbide and equivalent materials are well known.

The second factor which would tend to limit its use is the cost of the material and its fabrication. Also to be considered is the question of whether it will pay for itself.

It is chiefly the greater number of deep wells wherein gas at exceptionally high pressure is encountered that has caused the oil producers to call for equipment that can stand up to the extremely severe condition of sand, driven in a high velocity stream of gas and/or liquid.

The difficulty and expense of pulling a string of tubing on a deep off-shore well is so great that it offers an inducement to the production of a blast joint that is practically indestructable even though the cost of the joint be high.

The impact effect of solid particles moving in a stream of gas is a function of $MV^2$ where M is the mass of the particle and V is the velocity thereof. Velocity is the unpredictable factor.

Consequently, the problem of maintaining the integrity of the well equipment, particularly the production tubing used at depths and pressures—such as were encountered in connection with Shell Oil Company Well designated as "No. 1 Ridgeway Management 35-3-N-2E"—is extremely difficult. The Oil and Gas Journal of June 2, 1975 reports that although it was a producing well, it was abandoned "Bottom hole pressure of 22,000 psi was encountered, believed to be the highest for a producing well anywhere in the world." [OGJ, Jan. 6, page 20]

The length of the completed blast joint and the method of producing the joint of the present invention are preferably, but not necessarily, dependent on standard lengths, sizes and joints of tubing generally employed throughout the industry. As a practical matter, the length of the blast joint of this invention is, preferably but not necessarily, substantially equal to the standard length of production tubing in order to fit in with the handling and storage facilities available at a well head, and particularly at an offshore platform. The chief variable factors are the location of the level or levels at which entry of the well fluid is admitted to the flow tube, the pressures of the fluid encountered, and the nature of the solids entrained in the outflow.

BRIEF SUMMARY OF THE INVENTION

The present invention provides a flow tube of any convenient length—preferably of one or more standard pipe joint lengths for economy and convenience in handling—and having standard couplings at the ends and being protected throughout its length between couplings, with relatively short protective rings assembled into a continuous cylindrical surface which is presented to the outflow from the well. The rings may consist, for example, of cemented tungsten carbide produced in the form of short cylindrical rings placed shoulder-to-shoulder axially in line along the length of the protected tube between the coupling portions of the tube upon which the rings are mounted and supported. The rings in the preferred form of blast joint are individually quadrilateral and rectangular in cross section and are held shoulder-to-shoulder in contact with each other by adjustable clamping rings fastened, preferably, by set screws engaging the central tubular core of the blast joint.

While in describing a specific embodiment of my invention I refer to cemented tungsten carbide as the substance of which the refractory rings are made, it is to be understood that this is by way of illustration and not by way of limitation except as the context so requires. In the context of this disclosure and claimed subject matter, equivalent temperature and wear resistant refractory materials may be employed in practicing the present invention.

The present invention involves the underlying concept of utilizing cemented tungsten carbide or its equivalent as a material of suitable characteristics as an available blast resisting material of great strength and hardness and non-corrodible character, capable of enduring the blast of liquid and/or gas borne sand or other abrasive materials issuing at high velocity from a region of high pressure such as a deep oil well. It involves further the concept of overcoming the difficulty of brittleness, internal stresses, and frangibility of the material by forming it into rings or short tubular sections and assembling these short sections coaxially end-to-end upon a supporting production pipe preferably having standard oil well type coupling terminals. The limitation in axial length of the individual rings tends to limit internal stresses.

This feature of (axially) short cylindrical wear rings also reduced the difficulty and cost of manufacture and facilitates handling without breakage, both in erection of the blast joint to go down in the well, as well as to allow flexure when passing around curves in the well itself, as well as during lowering into the well.

By employing a series of short rings, quadrilateral in cross section of said carbide (which is extremely hard and rigid) carried on steel tubing and in steel sheath pipe, a certain degree of flexibility in a string is attained, which is impossible in a long, straight, integral section of the hard wear resistant material under the same conditions. The stretch of the tension element in the assembly is greater than the foreshortening of the compression elements under a bending stress.

The production of a successful blast joint, as per the present disclosure, involves a greater initial cost over known forms of blast joint, but will avoid the cost of a replacement of prior blast joints and thereby effect an overall saving.

An illustrative example of the method of organizing and supporting the individual rings of carbide to form a unitary assembly is herein disclosed. It comprises, broadly dividing a supporting pipe joint into two sections which are, in the subsequent course of construction, joined by a flush joint. Retainer sleeves or collars for holding the carbide rings in place in an axial direction are disposed at the outer ends of the two end sections of the divided unit. The carbide rings in the specific embodiment herein illustrated, and described below, are preferably disposed with half of the rings mounted on one pipe section and half on the other section. Two sections of sheath pipe are passed endwise over the corresponding groups of rings. The function of the sheath pipe is to provide mechanical support and protection which is particularly desirable in handling the assembled blast joint for shipment and installation.

Initially, a length of API production tubing is cut into two sections which are threaded so that they may later be screwed together under a predetermined torque to constitute a flush joint. Two separate groups of rings are assembled on the two tubing sections respectively while they are separated, and after those pipe sections are joined, the rings are brought axially together by moving the clamping rings endwise toward the center of the unit.

Thereafter the protective sheath sections are brought together and welded, and the hollow headed set screws in the clamping rings are turned down and tightened. The blast joint is lifted by attaching the cable of the crane to the box end of the joint and lowered blast joint endwise into the casing of the well. Where a blast joint of a length greater than that of a single length of tubing is desired, it may be made up of additional length or lengths of tubing, a correspondingly greater number of rings, and an additional length of protective sheath tubing.

It has been determined that the rings of carbide of a width (axially, i.e., lengthwise of the string) not materially greater than one (1) inch for a length of standard production tubing the finish blast joint may be lifted from lying in a horizontal position on the working platform, by attachment of the crane cable to the box end of the joint and picking up the blast joint into a vertical position in which vertical position it is then lowered into the well casing. Such handling and assembly of production tubing is standard practice.

The Prior Art

The prior art attempted the employment of extended tubular sections of tungsten carbide to serve as so-called "blast joints" for minimizing the erosion produced by high velocity impact of gas and liquid charged with sand, discharged from a well against the delivery tubing of an oil well during production. While use of the material was suggested as a possibility, a decade ago, it presented major drawbacks which discouraged attempts to utilize it. First was the initial cost of the material and the difficulty of shaping it into extended tubular form, and the second was the difficulty of handling long, thin and yet heavy tubular sections of the material, which is of high specific gravity and difficult to work.

A further item which dissuaded attempts to use it was the rigidity and brittle nature of the material which could not—inadequately supported in the lengths deemed necessary for its intended use—endure handling stresses or be subjected to any substantial shock, or the requirement for bending which is now frequently practiced by angularly or laterally directed drilling.

The structure of the blast joint of the present invention lends itself to recovery of the blast joint if and when the well no longer requires it.

DESCRIPTION OF THE DRAWINGS

In the attached drawings
FIG. 1 is a side elevational view (with parts broken away) of a blast tube of the present invention;
FIG. 2 is a vertical longitudinal axial section on a larger scale taken on the line 2—2 of FIG. 1; the pin end of the sections shown in FIGS. 1 and 2 is upset for a short distance above the threads;
FIG. 3 is a similar axial longitudinal vertical section on the line 3—3 of FIG. 1;
FIG. 4 is a similar vertical longitudinal axial section taken on the line 4—4 of FIG. 1;
FIG. 5 is a side elevational view of an API tubing section divided into two parts supported on cross bars of a rack and prepared and threaded for a flush joint;
FIG. 6 is a side elevational view of the two parts shown in FIG. 5 having the end retainer rings passed over the corresponding two sections;
FIG. 7 is a similar side elevational view showing the two sections with carbide rings passed over the tubing and extended to the respective retainer rings;
FIG. 8 is a similar side elevational view showing the sheath pipe telescoped over the corresponding carbide rings;
FIG. 9 is a similar side elevational view at the stage where the protective metal sheathing has been telescoped over the carbide rings and the two sections are being secured together at the flush joint;
FIG. 10 is a similar side elevational view which shows the two underlying tube sections threaded together in a flush joint; and
FIG. 11 is a similar view showing the clamping rings and the sheath pipe sections moved endwise towards and into contact with each other for welding the adjacent ends of the sheath pipes together.

DESCRIPTION OF THE PREFERRED EMBODIMENT

The blast joint shown in FIG. 1 in side elevation, with parts of its length broken away, comprises the central tube 2 which is continuous from end-to-end. It has at its lower end, as shown particularly in FIG. 1, a threaded pin joint 3 and at the opposite end a threaded box joint 4. The tube 2 which extends from end-to-end is initially formed of two sections 2a and 2b joined by a flush joint. (See FIGS. 3 and 5–11) Clamping collars 16 and 15 are of an internal diameter of a size to fit snugly on the external cylindrical surface of the central tubing 2a. A series of Allen head set screws 17 are seated and disposed between the outer surfaces of the sleeve in threaded holes in the collars 15 and 16 and are designed to grip tubing 2 or release the same under the conditions hereafter explained. These collars 15, 16 are of an internal diameter less than that of the box joint 4. With the set screws 17 released, the corresponding collars may be slid endwise of the tube 2 over the ends 13, 14 so that they may be properly positioned adjacent the outer ends of the units 11 and 12. The threads on the pin joint 3 match the threads in the box joint 4. The central part of the tube 2 includes the flush joint 8 (FIG. 3) which is made up tight to prescribed torque by the application of pipe wrenches of suitable length and predetermined loading. Segments 11 and 12 are formed by cutting a standard production length of tubing into two parts of unequal length (the drawings being diagrammatic) and forming the threaded pin 13 and threaded socket 14 on the adjacent ends. With the two parts thus separated, the next step is illustrated in FIG. 6. It consists in mounting upon each of the two parts of tubing clamping sleeves 15 and 16. Each of these sleeves includes a group of set screws contained in the walls of the collars 15 and 16.

As shown in FIG. 7 a series of carbide rings fitting on the tube section are slid over the adjacent ends of the tube sections 11 and 12. These rings 18 fit snugly on the corresponding tube portions and abut against the retainer rings 15 and 16 leaving a free space at the center for the pin threads 13 and box threads 14 on tube sections 11 and 12 separated sufficiently to allow the outer protecting metal sleeves 19 and 20 to be telescoped over the corresponding group of rings on each of the tube segments 11 and 12. The arrows on FIG. 7 indicate the direction of application of the rings 18 and the movement of rings 18 endwise of the tube segments 11 and 12, as also indicated by the arrows in FIG. 8.

At this stage of the assembly the clamping rings 15, 16 will have been moved outwardly towards the outer or remote ends of the tube segments and the protective rings 18 are pressed against the clamping rings 15, 16 towards the outward ends of the tube segments to provide a clear space at the center for applying the protective sleeves 19 and 20 over the two sets of rings 18, 18 and to abut them against the clamping sleeves 15 and 16 as shown in FIG. 8. The clamping screws 17, 17 hold the sleeves 15, 16 firmly to the underlying tube segments and the clamping rings hold the rings together axially.

At this stage, the tube segments 11 and 12 are brought endwise towards each other as shown in FIG. 9 to screw thread the pin 13 and box or socket 14 together into a flush joint. The two parts 11 and 12 are thereby united and assume the position shown in FIG. 9. The pin end 13 is threaded into the socket 14 making a flush joint, the two parts 13 and 14 being screwed together under predetermined torque by the use of suitable pipe wrenches. When the tapered pin and socket joint 13, 14 has been completed, as above stated, the recessed set screws 17 in the clamping ring 15 are released and the rings with the protective sleeve 19 and clamping ring 15 are slid to the right as viewed in FIG. 10 to abut the two sets of rings on the two segments of tubing; and the protecting sleeve segments 19 and 20 are abutted and welded circumferentially at 21 as illustrated in FIG. 11. The clamping ring 15 at the left end of the assembly in FIG. 11 is released by backing off the set screws 17, and said clamping sleeve 15 and the left hand group of rings, as illustrated in FIGS. 7-11, after the protective sleeves 19 and 20, which were applied as shown in FIG. 9, have been brought together and welded at 21 as shown in FIG. 11, and the hollow head set screws 17 in the clamping collars 15 and 16 have been tightened, the blast joint is completed.

EXAMPLE

For producing one 40' blast joint, the following are materials and parts in suitable form and dimensions for the production of a carbide armored blast joint:

1. Two pipe joints 2⅜", each 30' long.
2. 480 1" length carbide rings = 40 feet carbide.
3. Two retainer rings with 16 hollow head set screws (made of bar stock).
4. Outer pipe over carbide rings 3¼" od 0.134" wall.
5. Radial wall thickness of carbide rings — 0.250" for 2⅜" tubing.

FABRICATION AND ASSEMBLY

A. Two joints of production tubing - each 30' long.
B. Determine where to cut each for making the flush joint since, in manufacture, each end has been upset so 6" is allowed at each end to avoid any binding of the rings during assembly.
C. Allow clear space of 3'-0" at the box end for handling.
D. Allow 6" each for the space taken up by the two retainer rings.
E. Allow 6" from each end to avoid binding of the carbide rings during assembly.
F. On the pin end allow 6" for the upset in manufacture;
G. On the pin end allow 1' additional space for sliding the rings away to allow for wrench to tighten up the flush joint assembly; and
H. Finally allow 6" for the retainer ring on the pin end.

It is desirable to locate the flush joint 13, 14 nearer the pin end 3 than the box end 4 to provide greater strength to the assembly when it is raised by the box end from the horizontal to the vertical to go into the well.

To accomplish this, assume that two 30' lengths of productive tubing are cut as follows: one piece 19'-0" from the pin end and the other 27'-0" from the box end. The odd lengths left over are put aside. The female flush joint thread is then put in the cut end of the 19'-0" length and the male flush joint thread is put on the cut end of the 27'-0" length containing the original box end.

The outside pipe, in the above example, must be cut to the proper length so that the rings 18, 18 and outer protective pipe 19, 20 may be pushed back to expose the production tube by about 4" on each side of the flush joint so that the joint may be made up tight with pipe wrenches of a predetermined size.

The outer ends of the protective cover pipe sections 19, 20 embrace the stepped inner ends of the clamping rings 15 and 16 (as illustrated in FIGS. 9-11) with ¼" endwise clearance. The rings are in endwise compression — the covering pipe 19, 20 is not.

The mechanical handling of the two sections is assisted by the use of a horizontal cradle having transverse rollers allowing the tube sections to turn for threading.

The dimensions above given are exemplary and are not critical. The length of blast tubing to be provided for specific installations may vary. The practical limitation of the derrick available to place the joint may determine the length of the blast joint installed in a specific location.

The concept of utilizing the short carbide or equivalent rings is, that since the material that are capable of being used as the abrasion resisting rings in a blast joint are of such hard and inflexible character, they are not to be bonded to the wall of the tube they protect, and they can employ the elasticity of the protected steel tubes in a distributive manner which, by small closely spaced areas of contact, distribute the stress to the extent of avoiding fracture of the rings and thereby retaining the integrity of the rings and the entirety of the joint.

As a modification of the assembly of carbide rings which are directly in contact with each other and with the clamping sleeves 15, 16, I contemplate the insertion, between said rings and said collars of thin spring metal rings with radially extending corrugations to provide a limited degree of "give" for endwise expansion of the carbide rings.

While in the above disclosure I have specifically referred to the use of cemented tungsten carbide as the preferred wear resistant material, I do not intend, by naming it in the aforesaid specification and claims, to exclude other equivalent wear resistant materials for blast joints in an oil and/or gas well.

I claim:

1. A blast joint for steel oil well flow tube, said blast joint protecting an exterior portion of said flow tube from wear caused by contact with a high velocity flow of abrasive fluid, said blast joint comprising:

a series of contiguous heat and abrasive resistant wear rings having continuous substantially planar end walls from their inner periphery to their outer periphery, said end walls being parallel to each other and at right angles to the longitudinal axis of said flow tube, each of said wear rings having an axial length not substantially greater than one inch, said series of wear rings being coaxially mounted on said tube and in direct contact therewith;

a pair of spaced annular clamping collars carried on said flow tube adjacent threaded end portions of said tube, said clamping collars holding said series of wear rings in said contiguous relationship about said flow tube; and a protective tubular metal sheath enclosing said wear rings and in contact therewith, said tubular metal sheath being held in place about said rings by said clamping collars whereby said blast joint has sufficient flexibility to allow the shipment and installation of said blast joint with no fracturing of said series of wear rings due to bending of said flow tube thereby maintaining the integrity of said rings and said blast joint.

* * * * *